United States Patent
Takahashi (10) Patent No.: US 7,610,673 B2
(45) Date of Patent: Nov. 3, 2009

(54) METHOD OF MANUFACTURING A VERTICAL RECORDING MAGNETIC HEAD

(75) Inventor: Toru Takahashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 224 days.

(21) Appl. No.: 11/098,223

(22) Filed: Apr. 4, 2005

(65) Prior Publication Data

US 2005/0219752 A1   Oct. 6, 2005

(30) Foreign Application Priority Data

Apr. 5, 2004   (JP)   .............................. 2004-111346

(51) Int. Cl.
G11B 5/127   (2006.01)
H04R 31/00   (2006.01)
(52) U.S. Cl. .............. 29/603.07; 29/603.13; 29/603.15; 29/603.16; 29/603.18; 360/121; 360/122; 360/317; 427/127; 427/128
(58) Field of Classification Search .............. 29/603.08, 29/603.13–603.18, 606; 360/126, 317; 427/127, 427/128
See application file for complete search history.

(56) References Cited

U.S. PATENT DOCUMENTS 5,305,559 A * 4/1994 Ogawa ........................ 451/54
5,331,495 A   7/1994 Yoshida et al.
5,579,717 A * 12/1996 Crandell et al. ............. 116/208

FOREIGN PATENT DOCUMENTS

| JP | 60-177416 | 9/1985 |
|---|---|---|
| JP | 61-267913 | 11/1986 |
| JP | 01-169713 | 7/1989 |
| JP | 02-049212 | 2/1990 |
| JP | 04-078013 | 3/1992 |
| JP | 10-172115 | 6/1998 |
| JP | 2000-195020 | 7/2000 |

OTHER PUBLICATIONS

Notice of Preliminary Rejection issued in corresponding Japanese Patent Application No. 2004-111346 issued on Oct. 31, 2007.

* cited by examiner

*Primary Examiner*—Paul D Kim
(74) *Attorney, Agent, or Firm*—Brinks Hofer Gilson & Lione (57) ABSTRACT

A vertical recording magnetic head and a method of manufacturing the same is provided. The magnetic head includes a main magnetic pole layer on a surface opposite to a recording medium and a pair of neck height markers which is exposed on the surface around the main magnetic pole layer and which indicates a neck height position of the main magnetic pole layer by way of inter-exposure area ratios. The neck height markers have one cross sections that increases and the other that decreases even though the cross sections in a plane parallel to the surface are oriented toward forward or backward directions in a neck height direction. The neck height markers have the same cross sections at a specific cross sectional position parallel to the surface.

11 Claims, 3 Drawing Sheets

METHOD OF MANUFACTURING A VERTICAL RECORDING MAGNETIC HEAD

This application claims the benefit of priority to Japanese Patent Application No. 2004-111346 filed on Apr. 5, 2004, herein incorporated by reference.

BACKGROUND OF THE INVENTION

1. Field of the Invention

The present invention relates to a vertical recording magnetic head and a method of manufacturing the same, in which a vertical magnetic field is applied to a recording medium to perform a recording operation.

2. Description of the Related Art

A magnetic head apparatus includes a longitudinal recording (or in-plane recording) type in which a magnetic field parallel to the plane of a recording medium is applied to perform a recording operation, and a vertical recording type in which a magnetic field perpendicular to the plane of the recording medium is applied to perform a recording operation. Further, the vertical recording type becomes influential for higher recording density.

A vertical recording magnetic head has a structure in which a sub-magnetic pole layer and a main magnetic pole layer (single magnetic pole layer) are stacked on a surface opposite to a recording medium with a non-magnetic insulating layer interposed therebetween, as well known. The sub-magnetic pole layer and the main magnetic pole layer are magnetically connected at a deep side of a height direction. A coil layer, which is formed about a connecting portion for connecting the sub-magnetic pole layer and the main magnetic pole layer, exists within the non-magnetic insulating layer. If a recording magnetic field is induced between the sub-magnetic pole layer and the single magnetic pole layer by applying a power to the coil layer, a leakage magnetic field generated between lateral end portions of the opposite side of the recording medium of both the magnetic pole layers passes through a hard film of the recording medium in a perpendicular manner, and then returns through a soft film. The leakage magnetic field is concentrated on a cross section of the single magnetic pole layer having a small area. Thus, a magnetic recording is performed on a part opposite to the main magnetic pole layer.

In such a vertical recording magnetic head, a neck height position (height direction dimension) of the main magnetic pole layer becomes one factors to decide the recording characteristic. If the neck height position of the main magnetic pole layer is too low, the leakage magnetic field increases, and a track width thus increases. In contrast, if the neck height position of the main magnetic pole layer is too high, the leakage magnetic field becomes difficult to reach the recording medium, and recording efficiency is thus lowered. For this reason, it is necessary to control the neck height position of the main magnetic pole layer in an optimal manner.

Further, the magnetic head apparatus includes a vertical recording magnetic head apparatus of a combination type in which a vertical recording magnetic head is formed on a read element that reads information of the recording medium. In this combination type, the neck height of the main magnetic pole layer was conventionally decided on the basis of the height of the read element. That is, the height of the read element is decided by polishing one cross section that becomes the surface opposite to the recording medium while detecting a resistance value of the read element, which varies depending upon the area of the element, and finishing the polishing process when the resistance value of the read element reaches a predetermined value. The neck height position of the main magnetic pole layer is decided based on the position of the surface opposite to the recording medium. Japanese Unexamined Patent Application Publication Nos. 1985-177416, 1989-169713, 1990-49212, 1992-78013 and 2000-195020 are examples of the related art.

However, if polishing of the surface opposite to the recording medium is finished when the resistance value of the read element reaches a predetermined value, the height of the read element in each vertical recording magnetic head apparatus becomes constant. There is, however, a possibility that the neck height position of the main magnetic pole layer may become irregular and thus have deviation. As described above, if the neck height position of the main magnetic pole layer is short of a predetermined range, a desired recording characteristic cannot be obtained. Furthermore, since the main magnetic pole layer exposed onto the surface opposite to the recording medium is very small, it is difficult to view the neck height position.

SUMMARY OF THE INVENTION

The present invention has been made in view of the above-mentioned problems, and it is an object of the present invention to provide a vertical recording magnetic head and a method of manufacturing the same, in which a neck height position of a main magnetic pole layer can be easily controlled and viewed.

According to the invention, a neck height position of a main magnetic pole can be easily viewed (identified) by exposing a pair of neck height markers on a surface opposite to a recording medium and differentiating exposure area ratios of the pair of neck height marker on the surface opposite to the recording medium according to the neck height position.

According to an aspect of the invention, there is provided a vertical recording magnetic head including: a main magnetic pole layer formed with a track width on a surface opposite to a recording medium; and a pair of neck height markers which is exposed on the surface opposite to the recording medium around the main magnetic pole layer and which indicates a neck height position of the main magnetic pole layer by way of inter-exposure area ratios.

According to this aspect, it is preferable that the pair of neck height markers have their cross sections that one increases and the other decreases even though the cross sections in a plane parallel to the surface opposite to the recording medium are oriented toward any one of forward and backward directions in a neck height direction. Specifically, it is preferable that the pair of neck height markers have the same cross sections at a specific cross sectional position parallel to the surface opposite to the recording medium. In this case, the pair of neck height markers indicates that when exposure areas of the pair of neck height markers in the surface opposite to the recording medium are substantially equal to each other, the neck height position of the main magnetic pole layer is at an adequate position, indicates that when one of the exposure areas of the pair of neck height markers is smaller than the other, the neck height position of the main magnetic pole layer is shallower than the adequate position, and indicates that when one of the exposure areas of the pair of neck height markers is greater than the other, the neck height position of the main magnetic pole layer is deeper than the adequate position.

In more detail, practically, each of the pair of neck height markers has a plane shape of a triangle or a trapezoid, and is disposed in a direction opposite to each other in a neck height direction.

In addition, it is preferable that the pair of neck height markers be formed at the same stack height position as the main magnetic pole layer. According to this aspect, since the pair of neck height markers and the main magnetic pole layer are formed at the same time, that is, the pair of neck height markers and the main magnetic pole layer are formed at the same time under the same formation condition, it is possible to obtain a neck height marker with high precision. The pair of neck height markers may be formed at the same stack height position as the main magnetic pole layer and may be formed at both sides of a track width direction with the main magnetic pole layer interposed therebetween. In addition, the pair of neck height markers may be formed at one of both sides of the track width direction of the main magnetic pole layer.

In addition, the pair of neck height markers may be formed using the same magnetic material or non-magnetic material as the main magnetic pole layer.

According to another aspect of the invention, there is provided a method of manufacturing a vertical recording magnetic head including a main magnetic pole layer formed with a track width on a surface opposite to a recording medium; and a pair of neck height markers. The pair of neck height markers having their cross sections that one increases and the other decreases even though the cross sections in a plane parallel to the surface opposite to the recording medium are oriented toward any one of forward and backward directions in a neck height direction is formed simultaneously when the main magnetic pole layer is formed. In addition, a neck height position of the main magnetic pole layer is controlled based on exposure area ratios of the pair of neck height markers in the surface opposite to the recording medium.

According to a still another aspect of the invention, there is provided a method of manufacturing a vertical recording magnetic head including a main magnetic pole layer formed with a track width on a surface opposite to a recording medium; and a pair of neck height markers. The pair of neck height markers having their cross sections that one increases and the other decreases even though the cross sections in a plane parallel to the surface opposite to the recording medium are oriented toward any one of forward and backward directions in a neck height direction is formed simultaneously when the main magnetic pole layer is formed. In addition, the vertical recording magnetic head determines whether a neck height position of the main magnetic pole layer falls within an adequate position range based on exposure area ratios of the pair of neck height markers in the surface opposite to the recording medium. According to this aspect, the pair of height markers has their cross sections at a specific cross sectional position parallel to the surface opposite to the recording medium with the cross sections equal to each other, and the vertical recording magnetic head determines that when the exposure areas of the pair of height markers in the surface opposite to the recording medium are substantially equal to each other, the neck height position of the main magnetic pole layer is adequate.

According to a still further aspect of the invention, there is provided a method of manufacturing a vertical recording magnetic head including a main magnetic pole layer which is formed above a read unit having a read element and is formed with a track width on a surface opposite to a recording medium; and a pair of neck height markers. The pair of neck height markers having their cross sections that one increases and the other decreases even though the cross sections in a plane parallel to the surface opposite to the recording medium are oriented toward any one of forward and backward directions in a neck height direction is formed simultaneously when the main magnetic pole layer is formed. In addition, after performing a polishing process on the surface opposite to the recording medium to define a size of a height direction of the read element, the vertical recording magnetic head determines whether a neck height position of the main magnetic pole layer falls within an adequate position range based on exposure area ratios of the pair of neck height markers exposed on the surface opposite to the recording medium. According to this aspect, the pair of neck height markers has their cross sections at a specific cross sectional position parallel to the surface opposite to the recording medium with the cross sections equal to each other, and the vertical recording magnetic head determines that when the exposure areas of the pair of height markers in the surface opposite to the recording medium are substantially equal to each other, the neck height position of the main magnetic pole layer is adequate.

According to the invention, it is possible to obtain a vertical recording magnetic head and a method of manufacturing the same, in which a neck height position of a main magnetic pole layer can be easily controlled and viewed.

BRIEF DESCRIPTION OF THE DRAWINGS

FIG. 5 is a cross-sectional view of the pair of neck height markers exposed on a surface opposite to the recording medium, wherein FIG. 5A indicates that the neck height position is adequate, FIG. 5B indicates that the neck height position is shallow, and FIG. 5C indicates that the neck height position is deep.

DESCRIPTION OF THE PREFERRED EMBODIMENT

Figure 1:
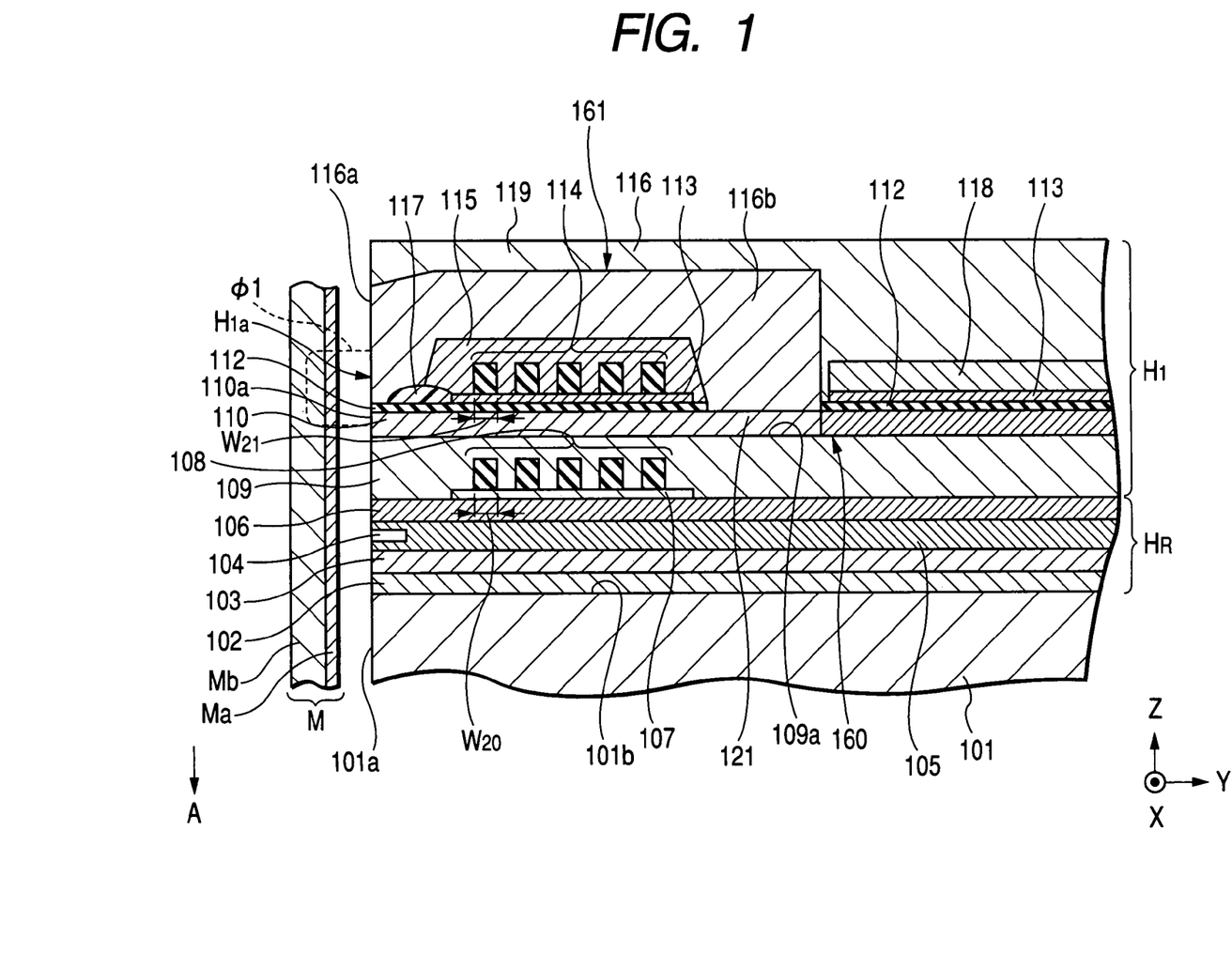
FIG. 1 is a partial cross-sectional view of a stack structure of a vertical recording magnetic head apparatus according to the present invention as seen from a track width direction.
Figure 2:
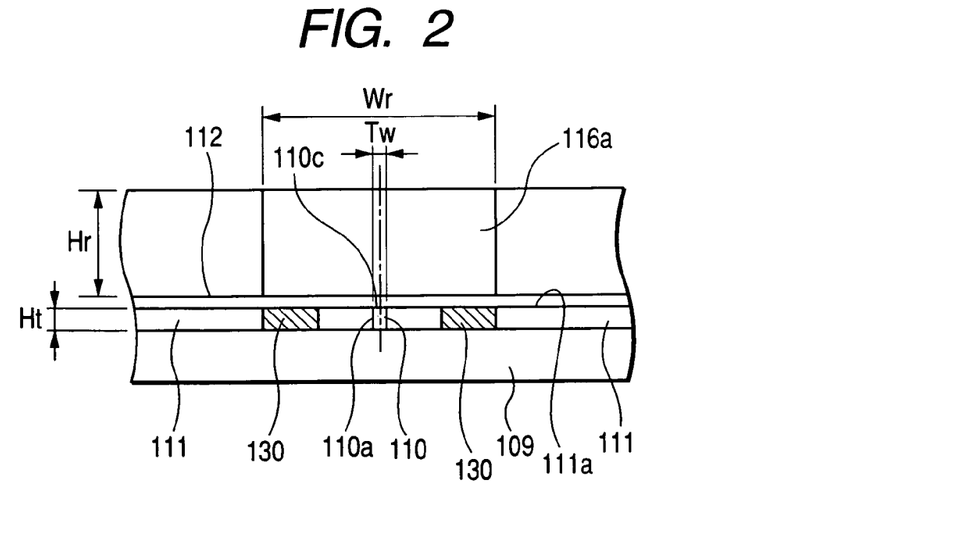
FIG. 2 is a partial cross-sectional view of a main magnetic pole layer shown in FIG. 1 as seen from a side opposite to a recording medium.

Preferred embodiments of the present invention will now be described with reference to the accompanying drawings. FIG. 1 is a partial cross-sectional view of a stack structure of a vertical recording magnetic head apparatus according to the present invention as seen from a track width direction. FIG. 2 is a partial cross-sectional view of the vertical recording magnetic head apparatus shown in FIG. 1 as seen from a side opposite to a recording medium. In the drawings, an X direction, a Y direction and a Z direction are defined as a track width direction, a leakage magnetic field direction from a recording medium M and a movement direction of the recording medium M, respectively. The recording medium M has a hard film Ma having high remaining magnetization on the surface thereof, and a soft film Mb having high magnetic permeability on the inner side than the hard film Ma. A vertical recording magnetic head apparatus H is a vertical recording magnetic head apparatus of a combination type in which a vertical recording magnetic head H1 is formed on a read unit HR having a read element 104.

A slider 101 is formed of a non-magnetic material such as $Al_2O_3.TiC$, etc., and has its opposite surface 101a opposite to the recording medium M. If the recording medium M rotates, the slider 101 is floated from the surface of the recording medium M by means of airflow generated on the surface of the recording medium M, or slides on the recording medium M. In FIG. 1, a direction in which the recording medium M moves with respect to the slider 101 is an A direction. A non-magnetic insulating layer 102 made of an inorganic material such as $Al_2O_3$ or $SiO_2$ is formed on a trailing-side cross section 101b of the slider 101. The read unit HR is formed on the non-magnetic insulating layer 102. The read unit HR includes a lower shield layer 103, an upper shield layer 106, and a read element 104 located within an inorganic insulating layer (gap insulating layer) 105 between the lower shield layer 103 and the upper shield layer 106. The read element 104 is a magneto-resistance effect element such as AMR, GMR and TMR.

A plurality of first coil layers 108 made of a conductive material is provided on the upper shield layer 106 via a coil insulating base layer 107. The first coil layers 108 can be formed using one or two or more kinds of non-magnetic metal materials, which are selected from Au, Ag, Pt, Cu, Cr, Al, Ti, NiP, Mo, Pd and Rh, or can have a stack structure of these non-magnetic metal materials. A coil insulating layer 109 made of an inorganic insulating material such as $Al_2O_3$ is formed around the first coil layers 108.

A top surface 109a of the coil insulating layer 109 is planarized. A first magnetic portion 160 (see FIG. 3) is formed on the top surface 109a. The first magnetic portion 160 is exposed from a side H1a opposite to the recording medium M (the opposite side of the recording medium) by a track width Tw. The first magnetic portion 160 includes a main magnetic pole layer 110 that extends from the opposite side H1a in a height direction by a predetermined length Nh, and a yoke portion 121 integrally formed with the main magnetic pole layer 110 at a base end portion 110b of the main magnetic pole layer 110, wherein the yoke portion 121 extends toward the inside of the height direction, and has a track width T1 wider than a track width Tw of the main magnetic pole layer 110. The main magnetic pole layer 110 can be plated with a ferromagnetic material, and can be formed using a material having a high saturation magnetic flux density, such as Ni—Fe, Co—Fe and Ni—Fe—Co. Specifically, the track width Tw of the main magnetic pole layer 110 is within a range of 0.1 to 1.0 µm, and the height (neck height) Nh of the main magnetic pole layer 110 is within a range of 0.1 to 1.0 µm. Furthermore, the yoke portion 121 is about 1 to 100 µm at a portion where the width T1 of the track width direction is the widest, and a height L3 toward the height direction is about 1 µm to 100 µm. The first magnetic portion 160 is a magnetic portion located on the side of the read unit, and can have the main magnetic pole layer 110 and the yoke portion 121 integrally formed.

Figure 3:
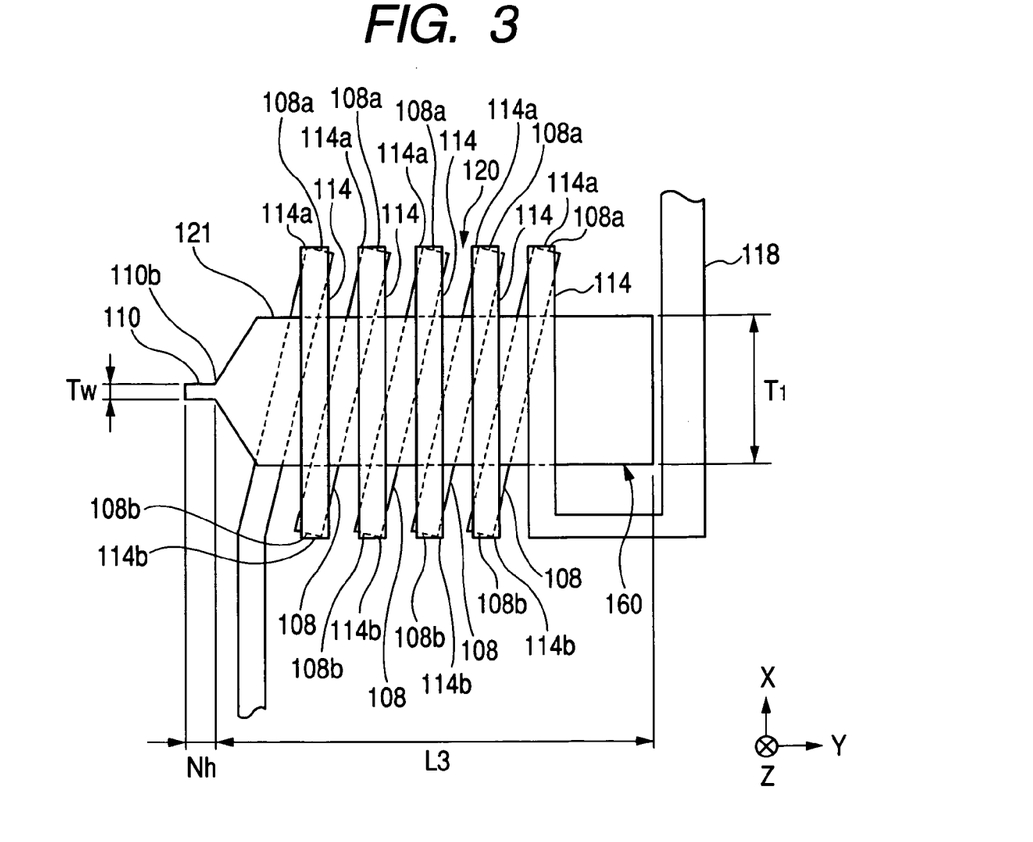
FIG. 3 is a plan view showing a neck height position of the main magnetic pole layer.

An insulating material layer 111 is formed around the main magnetic pole layer 110, as shown in FIG. 2. A top surface 111a of the insulating material layer 111 and a top surface 110c of the main magnetic pole layer 110 constitute the same plane. The insulating material layer 111 can be formed using one or two or more kinds of materials among alumina ($Al_2O_3$), $SiO_2$, Al—Si—O, Ti, W and Cr. A gap layer 112 made of an inorganic material such as alumina or $SiO_2$ is formed on the main magnetic pole layer 110 and the yoke portion 121 and on the insulating material layer 111. On the gap layer 112, second coil layers 114 are formed with the coil insulating base layer 113 interposed therebetween. The second coil layers 114 are formed in plural using a conductive material in the same manner as the first coil layers 108. The second coil layers 114 are formed of one or two or more kinds of non-magnetic metal materials, which are selected from, for example, Au, Ag, Pt, Cu, Cr, Al, Ti, NiP, Mo, Pd and Rh, or can have a stack structure of these non-magnetic metal materials. The first coil layers 108 and the second coil layers 114 have their end portions 108a and 114a, and their end portions 108b and 114b, respectively, in the track width direction, electrically connected to each other, as shown in FIG. 3. The first coil layers 108 and the second coil layers 114 are wound around the main magnetic pole layer 110 and the yoke portion 121 to form a toroidal coil layer 120. A width $W_{20}$ in the height direction of the first coil layers 108 and a width $W_{21}$ in the height direction of the second coil layers 114 have the same size.

A coil insulating layer 115 made of an inorganic insulating material such as $Al_2O_3$ is formed around the second coil layers 114. A return path layer 116 (second magnetic portion 161) made of a ferromagnetic material such as permalloy is formed from the coil insulating layer 115 to the gap layer 112. The return path layer 116 has a front end surface 116a exposed from the surface H1a opposite to the recording medium M, and a connecting portion 116b connected to the main magnetic pole layer 110 more located at the inner side of the height direction than the surface H1a opposite to the recording medium M. A magnetic path that extends from the main magnetic pole layer 110 to the return path layer 116 through the connecting portion 116b is formed. As shown in FIG. 2, the thickness Ht of the front end surface 110a of the main magnetic pole layer 110 is smaller than a thickness Hr of the front end surface 116a of the return path layer 116. Further, the size Tw in the track width direction of the front end surface 110a of the main magnetic pole layer 110 is significantly smaller than a width Wr in the same direction of the front end surface 116a of the return path layer 116. Therefore, in the surface H1a opposite to the recording medium M, the area of the front end surface 110a of the main magnetic pole layer 110 is sufficiently smaller than that of the front end surface 116a of the return path layer 116, a magnetic flux φ of the leakage recording magnetic field is concentrated on the front end surface 110a of the main magnetic pole layer 110.

A Gd crystal layer 117 made of an inorganic or organic material is formed on the gap layer 112 and at a location spaced apart from the surface H1a opposite to the recording medium M by a predetermined distance. A length of a gap depth of the vertical recording magnetic head H1 is defined by a distance from the surface H1a opposite to the recording medium M to a front end portion of the Gd crystal layer 117. Furthermore, a read layer 118 that extends from the second coil layers 114 is formed in the inner side of the height direction of the connecting portion 116b of the return path layer 116 is formed with the coil insulating base layer 113 interposed therebetween. The return path layer 116 and the read layer 118 are covered with a protective layer 119 made of an inorganic non-magnetic insulating material, etc.

In the vertical recording magnetic head H1, if a recording current is applied to the first coil layers 108 and the second coil layers 114 through the read layer 118, a recording magnetic field is induced into the main magnetic pole layer 110 and the return path layer 116 by means of a current magnetic field of the current that flows into the first coil layers 108 and the second coil layers 114. In the surface H1a opposite to the recording medium M, the magnetic flux φ1 of the recording magnetic field flies from the front end surface 110a of the main magnetic pole layer 110 and then passes through the soft film Mb after passing through the hard film Ma of the recording medium M, whereby a recording signal is recorded on the recording medium M. After that, the magnetic flux φ1 then returns to the front end surface 116a of the return path layer 116. The magnetic flux φ1 that returns to the return path layer 116 flows from the connecting portion 116b of the return path layer 116 to the main magnetic pole layer 110, and then flies from the front end surface 110a of the main magnetic pole layer 110. As a result, a repetitive recording operation is performed.

Figure 4:
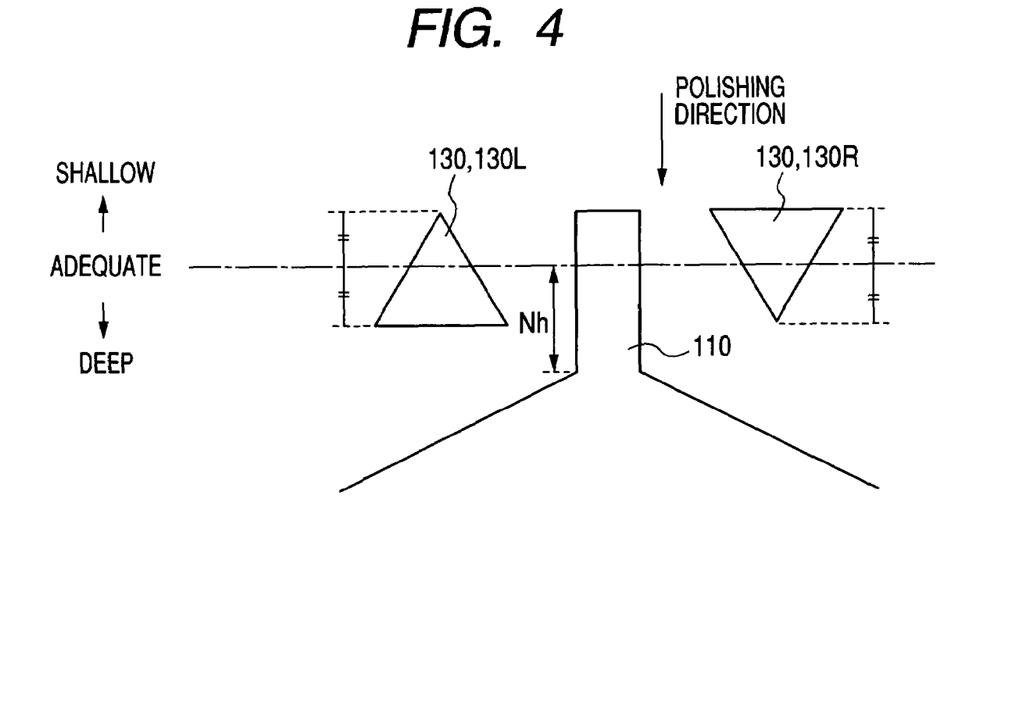
FIG. 4 is a plan view showing a pair of neck height markers provided around the main magnetic pole layer.

The vertical recording magnetic head apparatus having the above-mentioned structure includes a pair of neck height markers 130 (130R and 130L), which are exposed around the main magnetic pole layer 110 (the front end surface 110a) in the surface H1a opposite to the recording medium M, and indicate a neck height position (neck height) Nh of the main magnetic pole layer 110 by way of inter-exposure area ratios, as shown in FIG. 2. The pair of the neck height markers 130R and 130L are formed on the top surface 109a of the coil insulating layer 109 by means of, for example, a plating method, in the same process and same ferromagnetic material as the main magnetic pole layer 110. FIG. 4 is a plan view illustrating the pair of the neck height markers 130R and 130L immediately after being formed (before a polishing process of the surface H1a opposite to the recording medium M).

As shown in FIG. 4, the pair of the neck height markers 130R and 130L is disposed so as to have forward and backward directions in a height direction (a polishing direction) in a state in which the main magnetic pole layer 110 is interposed therebetween. Cross sections of the pair of the neck height markers 130R and 130L in the plane parallel to the opposite surface H1a of the recording medium M have one increasing and the other decreasing although the neck height markers 130R and 130L are directed toward one of the forward and backward directions in the height direction. Thus, the cross sections of the pair of the neck height markers 130R and 130L at a specific cross section position parallel to the opposite surface H1a are set to be approximately the same. Since the plane shape of each of the neck height markers 130R and 130L is a regular triangle, a specific cross section position A where the cross sections are approximately the same is a middle position in the height direction of the neck height markers 130R and 130L.

In the present embodiment, the pair of the neck height markers 130R and 130L represent an adequate position of the neck height position Nh of the main magnetic pole layer 110 in the cross sectional position A. Further, when the cross sections of the pair of the neck height markers 130R and 130L are smaller than the neck height markers 130R located at the right side of the drawing in the neck height markers 130L located at the left side of the drawing in the plane parallel to the surface H1a opposite to the recording medium M, it means that the neck height position Nh of the main magnetic pole layer 110 is shallow (the neck height is greater than an adequate value). When the cross sections of the pair of the neck height markers 130R and 130L are greater than the neck height markers 130R located at the right side of the drawing in the neck height markers 130L located at the left side of the drawing in the plane parallel to the surface H1a opposite to the recording medium M, it means that the neck height position Nh of the main magnetic pole layer 110 is deep (the neck height is smaller than an adequate value).

Figure 5A:
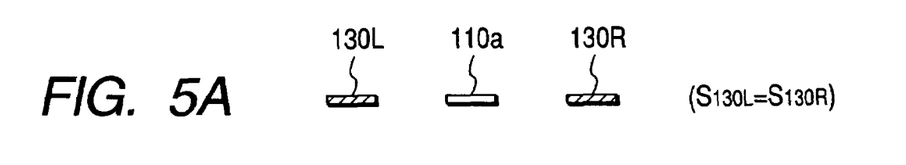
Figure 5B:
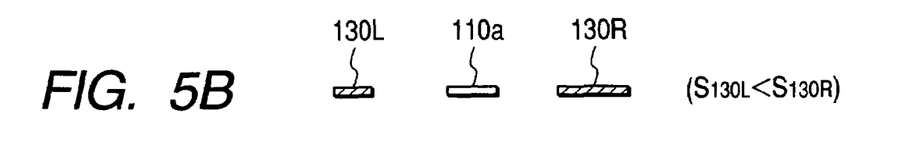
Figure 5C:
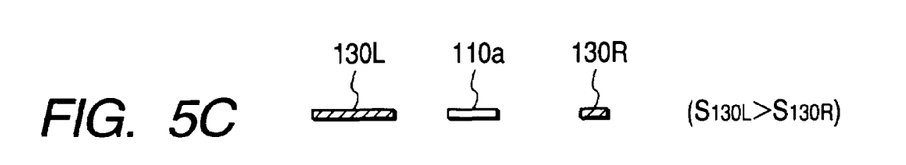

As described above, the vertical recording magnetic head apparatus is formed in such a manner that a plurality of the head structures having the read unit HR and the vertical recording magnetic head H1 is simultaneously formed in the plurality of head formation regions formed on the wafer substrate, the wafer substrate is cut for each head formation region to divide it into a plurality of individual head substrates, and a polishing process is performed on one cross section which becomes the surface opposite to the recording medium of each of the divided head substrates, thus defining the height of the read element 104 of the read unit HR. The polishing process is performed while detecting a read resistance value of the read element 104, and is then completed when the read resistance value reaches a predetermined value. The polishing process causes the surface H1a opposite to the recording medium M to be formed, and the neck height position Nh of the main magnetic pole layer 110 to be defined together with the height of the read element 104. In the formed opposite surface H1a, the pair of the neck height markers 130R and 130L is exposed at both sides between which the main magnetic pole layer 110 is inserted. At this time, as shown in FIG. 5A, it can be seen that if the exposure areas of the pair of the neck height markers 130R and 130L are approximately the same (the exposure area ratio=1:1), the neck height position Nh of the main magnetic pole layer 110 is adequate. In contrast, it can be seen that if one of the exposure areas of the pair of the neck height markers 130R and 130L is smaller than the other, the neck height position Nh of the main magnetic pole layer 110 is not proper (shallow or deep). In this case, since there is a possibility that a desired recording characteristic cannot be obtained, the corresponding vertical recording magnetic head can be selected as a defective product.

As such, if the exposure area ratio in the surface H1a opposite to the recording medium M of the pair of the neck height markers 130R and 130L is used as a reference (decision reference) of the neck height position Nh of the main magnetic pole layer 110, it is possible to determine the neck height position Nh in a relative manner. It is also possible to view the neck height position Nh of the main magnetic pole layer 110 more exactly and easily regardless of deviation in the size of the pair of the neck height markers 130R and 130L. Furthermore, for example, in a construction in which the neck height position of the main magnetic pole layer is absolutely indicated based on the size or exposure area (or difference), etc. of neck height markers, if the sizes of the neck height markers are irregular, there is a possibility that the neck height position of the main magnetic pole layer is erroneously indicated due to the irregularity.

In the above embodiment, description has been given on the vertical recording magnetic head apparatus of the combination type having the read element 104. It is, however, to be understood that the present invention can be applied to a vertical recording magnetic head apparatus having only the vertical recording magnetic head H1. When the present invention is applied to a single vertical recording magnetic head apparatus, not only the neck height position Nh of the main magnetic pole layer 110 can be indicated using the exposure area ratio of the pair of the neck height markers 130R and 130L that are exposed onto the surface H1a opposite to the recording medium M, but also the neck height position Nh of the main magnetic pole layer 110 can be controlled based on the same exposure area ratio when the surface H1a opposite to the recording medium M is polished.

In the present embodiment, it has been described that the pair of the neck height markers 130R and 130L are disposed at both sides of the main magnetic pole layer 110 in the track width direction. It is, however, to be noted that the pair of the neck height markers 130R and 130L can be disposed at only one side of the main magnetic pole layer 110 in the track width direction so that the right and left sides of the pair of the neck height markers 130R and 130L are not misunderstood.

Furthermore, the pair of the neck height markers 130R and 130L can be formed on an upper layer or a lower layer of the main magnetic pole layer 110 not at the same stack height position as the main magnetic pole layer 110, and can be formed using a magnetic material or non-magnetic material different from that of the main magnetic pole layer 110. If the pair of the neck height markers 130R and 130L are formed using the same process and material (under the same condition) as the main magnetic pole layer 110 as in the present embodiment, it is possible to indicate the neck height position Nh of the main magnetic pole layer 110 exactly without being influenced by deviation in matching between layers or difference in the formation condition.

Moreover, the plan shapes of the pair of the neck height markers 130R and 130L can be constructed in such a way that one increases and the other decreases although the cross sections in the plane parallel to the surface H1a opposite to the recording medium M are oriented toward one of the forward and backward directions of the height direction, and can be, e.g., a trapezoid.

What is claimed is:

1. A method of manufacturing a vertical recording magnetic head including a main magnetic pole layer formed with a track width on a surface opposite to a recording medium, the method comprising the steps of:
    forming a pair of neck height markers so that when a plane, that intersects the pair of neck height markers, moves from a shallow side to a deep side, an area of a portion of the plane that intersects the first of the pair of neck height markers increases while an area of a portion of the plane that intersects the second of the pair of neck height markers decreases, wherein
        the first and the second of the pair of neck height markers are disposed spaced apart and not in contact with each other
        the first of the pair of neck height markers has a first side in a cross section perpendicular to the surface opposite to the recording medium and parallel to the direction in which the first and the second of the pair of neck height markers are separated, the second of the pair of neck height markers has a second side in the cross section perpendicular to the surface opposite to the recording medium and parallel to the direction in which the first and the second pair of neck height markers are separated, and
        the first side and the second side face each other and are in parallel; and
    controlling a neck height position of the main magnetic pole layer based on exposure area ratios of the pair of neck height markers in the surface opposite to the recording medium.

2. The method of manufacturing a vertical recording magnetic head according to claim 1, the vertical recording magnetic head further including a yoke portion formed successively to the main magnetic pole layer so as to extend in a direction further away from the surface opposite to the recording medium and having a width which becomes wider as the distance from the surface opposite to the recording medium becomes greater.

3. The method of manufacturing a vertical recording magnetic head according to claim 1, further comprising polishing the surface opposite to the recording medium in the neck height direction such that a surface to be polished becomes parallel to the surface opposite to the recording medium before controlling the neck height position.

4. A method of manufacturing a vertical recording magnetic head including a main magnetic pole layer formed with a track width on a surface opposite to a recording medium, the method comprising the steps of:
    forming a pair of neck height markers so that when a plane, that intersects the pair of neck height markers, moves from a shallow side to a deep side, an area of a portion of the plane that intersects the first of the pair of neck height markers increases while an area of a portion of the plane that intersects the second of the pair of neck height markers decreases, wherein
        the first and the second of the pair of neck height markers are disposed spaced apart and not in contact with each other,
        the first of the pair of neck height markers has a first side in a cross section perpendicular to the surface opposite to the recording medium and parallel to the direction in which the first and the second of the pair of neck height markers are separated, the second of the pair of neck height markers has a second side in the cross section perpendicular to the surface opposite to the recording medium and parallel to the direction in which the first and the second pair of neck height markers are separated, and
        the first side and the second side face each other and are in parallel; and
    determining whether a neck height position of the main magnetic pole layer falls within an adequate position range based on exposure area ratios of the pair of neck height markers interposing the main magnetic pole layer therebetween in a surface to be polished.

5. The method of manufacturing a vertical recording magnetic head according to claim 4,
    wherein the pair of height markers has cross sections at a specific cross sectional position parallel to the surface opposite to the recording medium with the cross sections equal to each other, and determining that when the exposure areas of the pair of height markers in the surface opposite to the recording medium are substantially equal to each other, the neck height position of the main magnetic pole layer is adequate.

6. The method of manufacturing a vertical recording magnetic head according to claim 4, the vertical recording magnetic head including a yoke portion formed successively to the main magnetic pole layer so as to extend in a direction further away from the surface opposite to the recording medium and having a width which becomes wider as the distance from the surface opposite to the recording medium becomes greater.

7. The method of manufacturing a vertical recording magnetic head according to claim 4, further comprising polishing the surface opposite to the recording medium in the neck height direction such that a surface to be polished becomes parallel to the surface opposite to the recording medium before determining the neck height position.

8. A method of manufacturing a vertical recording magnetic head including a main magnetic pole layer formed with a track width on a surface opposite to a recording medium, the method comprising the steps of:
    forming a pair of neck height markers so that when a plane, that intersects the pair of neck height markers, moves from a shallow side to a deep side, an area of a portion of the plane that intersects the first of the pair of neck height markers increases while an area of a portion of the plane that intersects the second of the pair of neck height markers decreases, wherein
        the first and the second of the pair of neck height markers are disposed spaced apart and not in contact with each other,
        the first of the pair of neck height markers has a first side in a cross section perpendicular to the surface opposite to the recording medium and parallel to the direction in which the first and the second of the pair of neck height markers are separated, the second of the pair of neck height markers has a second side in the cross section perpendicular to the surface opposite to the recording medium and parallel to the direction in which the first and the second pair of neck height markers are separated, and the first side and the second side face each other and are in parallel; and after polishing the surface opposite to the recording medium to define a size of a height direction of the read element, determining whether a neck height position of the main magnetic pole layer falls within an adequate range based on exposure area ratios of the pair of neck height markers exposed on the surface to be polished.

9. The method of manufacturing a vertical recording magnetic head according to claim 8, wherein the pair of height markers has cross sections at a specific cross sectional position parallel to the surface opposite to the recording medium with the cross sections equal to each other, and determining that when the exposure areas of the pair of height markers in the surface opposite to the recording medium are substantially equal to each other, the neck height position of the main magnetic pole layer is adequate.

10. The method of manufacturing a vertical recording magnetic head according to claim 8, the vertical recording magnetic head further including a yoke portion formed successively to the main magnetic pole layer so as to extend in a direction further away from the surface opposite to the recording medium and having a width which becomes wider as the distance from the surface opposite to the recording medium becomes greater.

11. The method of manufacturing a vertical recording magnetic head according to claim 8, wherein the surface opposite to the recording medium in the neck height direction is polished such that a surface to be polished becomes parallel to the surface opposite to the recording medium.

* * * * *

UNITED STATES PATENT AND TRADEMARK OFFICE
CERTIFICATE OF CORRECTION

PATENT NO. : 7,610,673 B2 Page 1 of 1
APPLICATION NO. : 11/098223
DATED : November 3, 2009
INVENTOR(S) : Toru Takahashi It is certified that error appears in the above-identified patent and that said Letters Patent is hereby corrected as shown below:

In the Claims

In column 9, claim 1, line 28, immediately after "other" insert --,--.

Signed and Sealed this

Fifteenth Day of June, 2010

David J. Kappos
*Director of the United States Patent and Trademark Office*